(12) United States Patent  
Goodson et al.

(10) Patent No.: US 12,301,406 B2
(45) Date of Patent: May 13, 2025

(54) COMMUNICATION RESILIENCE IN A NETWORK

(71) Applicant: ADTRAN, Inc., Huntsville, AL (US)

(72) Inventors: Richard Lee Goodson, Huntsville, AL (US); Darrin L. Gieger, Huntsville, AL (US); Andrew T. Ruble, Athens, AL (US); Brent Priddy, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 18/270,703

(22) PCT Filed: Jan. 6, 2022

(86) PCT No.: PCT/US2022/011475
§ 371 (c)(1),
(2) Date: Jun. 30, 2023

(87) PCT Pub. No.: WO2022/150500
PCT Pub. Date: Jul. 14, 2022

(65) Prior Publication Data
US 2024/0080238 A1    Mar. 7, 2024

Related U.S. Application Data

(60) Provisional application No. 63/134,526, filed on Jan. 6, 2021.

(51) Int. Cl.
*H04L 41/0663* (2022.01)
*H04L 41/0604* (2022.01)
*H04L 41/0677* (2022.01)

(52) U.S. Cl.
CPC ...... *H04L 41/0663* (2013.01); *H04L 41/0627* (2013.01); *H04L 41/0677* (2013.01)

(58) Field of Classification Search
None
See application file for complete search history.

(56) References Cited

U.S. PATENT DOCUMENTS

| 7,644,317 B1 | 1/2010 | Sajassi et al. |
| 7,826,348 B2 | 11/2010 | Farinacci et al. |

(Continued)

FOREIGN PATENT DOCUMENTS

| CN | 103051536 | 4/2013 |
| EP | 0503284 | 9/1992 |

(Continued)

OTHER PUBLICATIONS

International Preliminary Report on Patentability in International Appln. No. PCT/US2022/021286, mailed on Oct. 5, 2023, 18 pages.

(Continued)

*Primary Examiner* — June Sison
(74) *Attorney, Agent, or Firm* — Fish & Richardson P.C.

(57) ABSTRACT

Methods and systems for resilient network communication are provided. In one aspect, a network includes multiple West NEs, spine elements, and East NEs. Each element has multiple physical communication interfaces. A working communication path connects the West NE to the East NE through a spine element. A protection communication path connects that West NE to that East NE through a different spine element. The working and protection communication paths terminate at the West NE and East NE at maintenance end points. A protection group is formed of the working communication path and the protection communication path. The protection group maintains a state designating an active path and a standby path. Maintenance groups at the spine elements monitor continuity messaging for their asso- (Continued)

ciated maintenance end points to determine network health. Faults between the West NEs and East NEs are detected through RDI and CCM.

10 Claims, 5 Drawing Sheets

(56) References Cited

U.S. PATENT DOCUMENTS

| | | | |
|---|---|---|---|
| 7,995,483 | B1 | 8/2011 | Bayar et al. |
| 8,659,994 | B2 | 2/2014 | Singh et al. |
| 9,509,590 | B2 | 11/2016 | Arberg et al. |
| 9,722,861 | B2 | 8/2017 | Bejerano et al. |
| 2002/0034962 | A1 | 3/2002 | Yokoyama |
| 2004/0066781 | A1 | 4/2004 | Shankar et al. |
| 2006/0050643 | A1 | 3/2006 | Yoshimoto et al. |
| 2007/0153791 | A1 | 7/2007 | Zheng et al. |
| 2007/0268817 | A1 | 11/2007 | Smallegange et al. |
| 2010/0290345 | A1 | 11/2010 | Geroe et al. |
| 2010/0315946 | A1 | 12/2010 | Salam et al. |
| 2011/0164502 | A1* | 7/2011 | Mohan ............... H04L 43/08 370/236.2 |
| 2012/0106321 | A1 | 5/2012 | Alon et al. |
| 2012/0195589 | A1 | 8/2012 | Nors |
| 2012/0250574 | A1 | 10/2012 | Marr |
| 2013/0054565 | A1 | 2/2013 | O'Connell et al. |
| 2014/0022886 | A1 | 1/2014 | Sinha |
| 2014/0169330 | A1 | 6/2014 | Rommer et al. |
| 2014/0185531 | A1 | 7/2014 | Liu et al. |
| 2014/0241205 | A1 | 8/2014 | Virk et al. |
| 2014/0307578 | A1* | 10/2014 | DeSanti ............ H04L 67/1097 370/254 |
| 2015/0358255 | A1 | 12/2015 | Kariya |
| 2015/0365742 | A1 | 12/2015 | Yang et al. |
| 2016/0036694 | A1 | 2/2016 | Abdul et al. |
| 2019/0306242 | A1 | 10/2019 | Thummalapalli et al. |
| 2020/0274735 | A1 | 8/2020 | Sekhri et al. |
| 2021/0152464 | A1 | 5/2021 | Brissette et al. |
| 2022/0311694 | A1 | 9/2022 | Goodson et al. |
| 2023/0188874 | A1 | 6/2023 | Platts et al. |
| 2024/0080237 | A1 | 3/2024 | Goodson et al. |
| 2024/0154861 | A1 | 5/2024 | Goodson et al. |

FOREIGN PATENT DOCUMENTS

| | | |
|---|---|---|
| EP | 2388961 | 11/2011 |
| EP | 2787684 | 10/2014 |
| EP | 2983329 | 2/2016 |
| WO | WO 2012042191 | 4/2012 |
| WO | WO 2017144375 | 8/2017 |
| WO | WO 2022150479 | 7/2022 |
| WO | WO 2022150488 | 7/2022 |
| WO | WO 2022150500 | 7/2022 |
| WO | WO 2022204101 | 9/2022 |
| WO | WO 2023107222 | 6/2023 |

OTHER PUBLICATIONS

International Search Report and Written Opinion in International Appln. PCT/US2022/049104, mailed on Feb. 28, 2023, 19 pages.
International Telecommunication Union, "Ethernet Protection Switching," Recommendation ITU-T G.8031/Y.1342 (Jun. 2006), Jun. 2006, 50 pages.
International Telecommunication Union, "Bidirectional Ethernet Protection Switching to Support Dual Parenting PON Protection," Recommendation ITU-TG.8013/Y.1731, Study Group 15, Jun. 2015, 8 pages.
Kang et al., "Restoration of Ethernet Services over a Dual-Homed GPON System—Operator Requirements and Practical Demonstration", Optical Fiber Communication/National Fiber Optic Engineers Conference, Feb. 24, 2008, 3 pages.
IEEE SA-Standards Board, "IEEE Standard for Local and Metropolitan Area Networks—Virtual Bridged Local Area Networks Amendment 5: Connectivity Fault Management," IEEE Computer Society, Dec. 2007, 1-260.
International Preliminary Report on Patentability in International Appln. No. PCT/US2022/011440, mailed on Jul. 20, 2023, 10 pages.
International Preliminary Report on Patentability in International Appln. No. PCT/US2022/011454, mailed on Jul. 20, 2023, 11 pages.
International Preliminary Report on Patentability in International Appln. No. PCT/US2022/011475, mailed on Jul. 20, 2023, 9 pages.
International Search Report and Written Opinion in International Appln. No. PCT/US2022/011440, dated Apr. 4, 2022, 12 pages.
International Search Report and Written Opinion in International Appln. No. PCT/US2022/011454, dated Apr. 20, 2022, 13 pages.
International Search Report and Written Opinion in International Appln. No. PCT/US2022/011475, dated Mar. 28, 2022, 11 pages.
International Search Report and Written Opinion in International Appln. No. PCT/US2022/021286, mailed on Aug. 10, 2022, 23 pages.
International Telecommunication Union, "Ethernet linear protection switching," Recommendation ITU-T G.8031/Y.1342 Amendment 1 (Mar. 2018), Mar. 2018, 1-98.
International Telecommunication Union, "Gigabit-capable passive optical networks (GPON): General characteristics," Recommendation ITU-T G.984.1 (Mar. 2008), 2009, 1-43.
International Telecommunication Union, "Operation, administration and maintenance (OAM) functions and mechanisms for Ethernet based networks," Recommendation ITU-T G.8013/Y.1731 (Aug. 2015), 2016, 1-102.
International Telecommunication Union, "Series G: Transmission systems and media digital systems and networks," ITU Standards, Feb. 2016, pp. 1-44.
International Preliminary Report on Patentability in International Appln. No. PCT/US2022/049104, mailed on Jun. 20, 2024, 12 pages.

* cited by examiner

COMMUNICATION RESILIENCE IN A NETWORK

BACKGROUND

Existing approaches to communication resilience result in significant communication overhead. Signaling and command and control messaging consumes bandwidth and processing resources. Detecting a network failure takes time and result in unacceptable communication degradation and outages. Resilient communication paths also lead to load balancing issues at critical points in the network, where multiple services are assigned to communications elements. These challenges compound as the size and scale of the network increases. Previous solutions either required broadcast of all multicast traffic on redundant paths to all downstream network elements, or complicated protocols for maintaining synchronization between the redundant paths. Therefore, the need arises for a solution for communication resilience that overcomes these, and other, challenges. A further need arises to optimally assign services to these redundant paths.

SUMMARY

This specification relates to communication resilience in a network. This specification describes an algorithm for assigning unicast and multicast services to a resilient switching fabric that optimizes the distribution of those services across the multiple paths between two end points. Applications of this aspect can be implemented in a software defined network or a traditional chassis-based system. However, the aspect is more generally useful for a network with multiple paths between two endpoints.

This specification also describes providing redundant paths through a network for multicast, and synchronizing multicast forwarding tables at each redundant network element and port between the redundant paths. In some applications, an network element broadcasts all upstream Internet Group Management Protocol ("IGMP") traffic to both uplink ports of a protection group, thus synchronizing the network elements between both paths, and then selects one of the uplink ports to receive all downstream IGMP and multicast traffic.

In general, this specification applies to networks containing many varied networking components, many varied protocols, multiple communication providers, multiple Virtual Local Area Networks ("VLANs"), and multiple endpoints. In a specific example, this specification provides solutions for a spine/leaf network or software define network for providing multicast services. Further, this specification offers solutions for wholesale applications where there are multiple communication providers operating over a shared infrastructure such that any communication provider can provide service to any subscriber served by the shared infrastructure. In addition, there may be multiple multicast VLANs traversing the network for different communication providers. However, the solutions in this specification could also be utilized in a traditional chassis-based architecture with a single service provider.

A working communication path is established between a first network element and a second network element. The working communication path communicates with a Maintenance End Point ("MEP") of the first network element and a MEP of the second network element. A protection communication path is established between the first network element and the second network element. The protection communication path communicates with a MEP of the first network element and a MEP of the second network element. Communication paths may be established between each of the physical interfaces of a first network element and a second network element. When the working path is in an active state, the protection path is in a standby state; when the protection path is in an active state, the working path is in a standby state. A failure on the path that is currently in that active state causes the path then in the standby state to be promoted such that it is then in an active state.

For multicast, the first network element forwards upstream network traffic to the active path and the standby path. For multicast, the first network element forwards downstream network traffic received on the active path while dropping downstream network traffic received on the standby path. For unicast, the first network element forwards network traffic to the second network element using the active path, and forwards network traffic received on the active path from the second network element; traffic received on the standby path is silently dropped and no traffic is forwarded on the standby path. For unicast, the second network element forwards network traffic to the first network element using the active path, and forwards network traffic received on the active path from the first network element; traffic received on the standby path is silently dropped and no traffic is forwarded on the standby path.

The network, which is comprised of its components, detects a network fault on the active or working communication paths using the MEPs. A network fault can be detected based on non-responsiveness of the MEPs at the network elements, or a fault can be detected based on a physical fault in a connection to the network element. The network responds to a detected network fault on the active communication paths by simultaneously promoting the standby communication path to become the active path and the active path to become the standby path.

Detecting a network fault on the active communication path based on non-responsiveness of the MEPs includes monitoring the active communication path using continuity check messages (CCMs) generated by the MEPs and communicated within the network. These continuity check messages include status information about a local port and a physical interface. The MEPs may be allocated in various ways. A network element may have a MEP on each physical interface of the network element. Other network elements may have multiple MEPs on each of their physical interfaces. These MEPs may be grouped into MEGs (Maintenance Entity Groups), also known as MAs (Maintenance Associations). The MEPs associated with multiple communication paths may all be part of the same MEG. Protection groups may also be established to protect service VLANs (VLANs carrying a service between a communication provider and subscriber). For instance, a particular working communication path and a particular protection communication path and their associated MEPs may be considered a protection group. In such a network, a MEG may be associated with an OAM VLAN for transporting continuity check messages. For a given protection group, the MEG associated with the working communication path will always be different from the MEG associated with the protection communication path. For a given protection group, the MEPs associated with the working communication path will both be in the same MEG, and the MEPs associated with the protection communication path will both be in the same MEG. CCMs originating from MEPs in a given MEG will all be transported on the same OAM VLAN, and each MEG will be associated with a different OAM VLAN. A protection group may be associated with one or more service VLANs.

In such a resilient network, with working and protection paths between the network nodes, there is also a need to optimally assign services to working and protection paths. Optimal assignment of services avoids overloading certain paths, starving others, and can enhance throughput and quality of service of the network traffic. As such, the use of the term optimal throughout this document refers to an assignment that improves a network condition or network management, and is not necessarily limited to a single best outcome or result.

This document describes techniques for optimal service assignment, which improve the functioning of telecommunications systems, and telecommunications related technologies, for example, by improving communication throughput, reducing latency, balancing processing load across networking devices, reducing communications caching and memory requirements of networking devices, and reducing network outages. For instance, for each service type there may be an associated class and weight in addition to other attributes such as CIR and PIR. Each service to be optimally assigned is associated with a specific service type. As one example, optimized assignment of services may then be accomplished by optimizing the balance of weight and class of services at the ports of the West NE while considering the weight and class of services received at ports of other network nodes. In another example, when adding a service with associated class and weight, criteria such as West NE port balance and port balance at receiving network nodes. In this example, receiving network nodes need not be a network endpoint and may also transmit or forward network traffic associated with the service.

This document further describes techniques specifically for assignment of unicast services and techniques specifically for the assignment of multicast services. However, in both cases a network service is associated with a specific service type, and each service type may contain a class and weight value. This document further describes techniques for protection of multicast services.

The techniques in this document, therefore, provide a method for communication resilience in a variety of network environments using redundant paths, efficient network health messaging, and rapid failover to maintain network uptime. The techniques also allow for load balancing of network traffic, CIR balancing, and the like through optimized service assignment to the communication paths in the network. For instance, the techniques allow optimizations across networks with a diverse mix of services on the different physical links. The techniques also allow a service provider to implement various optimizations such as round robin assignment, CIR balancing, defining service types, weighting service types, and the like. These techniques more evenly distribute the load assigned to any specific communications path, and results in a more robust communications network.

These and other embodiments can apply to OAM configurations, VLAN configurations, optical networking configurations, and ethernet configurations. In these configurations, network elements may include OLTs (Optical Line Terminations), spine switches, leaf switches, aggregation switches, and other components present in the network topology.

Particular embodiments of the subject matter described in this specification can be implemented so as to realize one or more of the following advantages. These advantages include synchronization of multicast tables in both the working and protect paths in the network elements. Advantages additionally include rapid switching between the active and standby paths during a failure. Another advantage is that network elements unaffected by a detected network fault will not switch, eliminating command and control overhead. Further, no special protocols are needed to maintain synchronization of the multicast tables in this system. Additionally, the same MEPS can be shared between unicast and multicast services, providing fault detection in both applications.

The techniques described in this document include methods and systems that improve establishment of communication paths between network components and assignment of services to those paths. The techniques combine several protocols and functions into a single novel solution that provides horizontal, scalable IGMP multicast services coupled with full backplane or spine/leaf resiliency. More generally, these methods and systems provide for quickly transitioning paths from active to standby. These methods and systems also increase resiliency in highly scalable network topologies. These methods and systems further optimize network traffic by optimizing assignment of services to communications paths. The benefits are especially apparent in networks with a diverse mix of services spread across different physical links.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
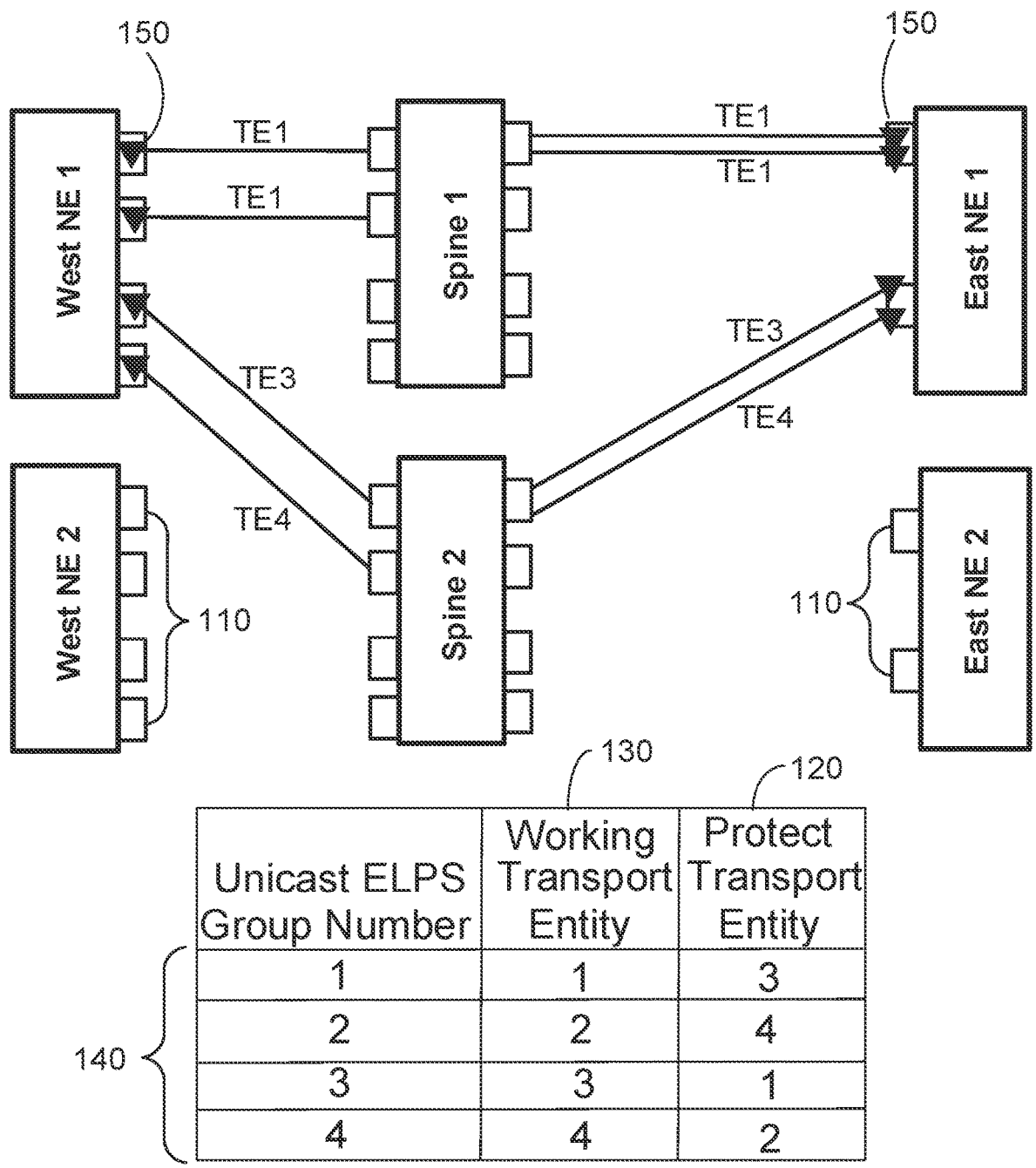
FIG. 1 shows unicast ELPS protection groups in a spine and leaf network.

Methods and systems for communication resilience are discussed throughout this document. As will be discussed in more detail with reference to the figures, multiple communication paths are established to create redundant links. Services are assigned to the redundant links in an optimized manner. The multiple communication paths are monitored for network faults which result in state changes within the redundant links whereby protection paths become active in order to maintain communications in the network.

For example, multiple pairs of communication paths are established between network elements and each service is assigned to a pair of communication paths (e.g., a transport entity (TE)). The pair of paths includes a working path and a protection path. The pair of paths has an associated state such that one of the paths is an active path and the other is a standby path. Typically in a non-fault state for unicast services, the working path is the active path and the protection path is the standby path. Typically for multicast services, when a fault occurs on the active path, the group state changes such that the standby become the active and vice versa. For multicast, this state continues until a fault is detected on the active path.

Network elements may include routers, switches, OLTs, spines, leafs, gateways, and the like. An OLT typically connects a passive optical network to aggregated uplinks and transmits shared downstream data in over the passive optical network to users.

The disclosure herein may be used in diverse network topologies as will be appreciated by one of skill in the art. One such topology is a spine-leaf network.

In a spine leaf network, every lower-tier switch (leaf) is connected to each of the top-tier switches (spine) in a full-mesh topology. The leaf layer consists of access switches that connect to subscribers and communications providers. The spine layer is the backbone of the network and is responsible for interconnecting all leaf switches. Every leaf switch connects to every spine switch in the fabric. The leaf switches may be a heterogeneous collection of network elements.

With respect to OAM (operations, administration and maintenance) network configurations, among many possible configurations, the availability of communication paths can be monitored using Maintenance Entity Groups (MEGs) and Maintenance End Points (MEPs). A MEG is a logical domain within an ethernet network. The MEG consists of network entities that belong to the same service inside a common OAM domain. A MEG may be associated to a specific VLAN, with several MEGs able to use the same VLAN value. For multicast services, VLANs enable more efficient distribution of IPTV multicast streams. A MEP defines an edge of an ethernet OAM domain. Network elements, such as West NEs and East NES, have a MEP associated with each interface. A MEG is associated with each spine. This association of MEPs and MEGs minimizes the number of MEPs and reduces continuity check message (CCM) processing load.

Services provisioned for the network are assigned to a pair of communication paths. Services to be provisioned are classified with a service type. Service type may include whether the service is a multicast service or unicast service. With respect to multicast services, each multicast service type is provisioned with a weight and class. The weight of a multicast service may include processing requirements, quality of service requirements, bandwidth requirements, and the like. The class of a multicast service may include standard definition video, high definition video, video conferencing, standard definition and high definition streaming audio, and the like. As one of skill in the art can appreciate, classes of multicast services may be differentiated by quality of service requirements or other factors. With respect to unicast services, each unicast service type is provisioned.

Service assignment is optimized in order to balance load on network elements, their ports, or communication paths, as one example. When a new multicast service is added to the system, the service may be assigned to a path pair such that the sum of the weights of all multicast services of the same class is balanced between the available pairs of paths. For example, setting the class and weight to one for all service types results in a round robin assignment of multicast services to the available pairs of paths.

For network elements such as an East NE, since upstream IGMP is forwarded to both the active and standby paths, both paths will have the same set of multicast services and the East NE port weight and class will be balanced. Therefore, in this situation, balancing of multicast class and weight need to only be done for the ports of East network elements.

Multicast services may operate according to established protocols. One protocol used for multicast management is IGMP (Internet Group Management Protocol). IGMP is used by hosts and adjacent routers on IP networks to establish multicast group memberships. IGMP allows the network to direct multicast transmissions only to hosts that have requested them. IGMP can be used for one-to-many networking applications such as online streaming video and gaming, and allows more efficient use of resources when supporting these types of applications.

Figure 2:
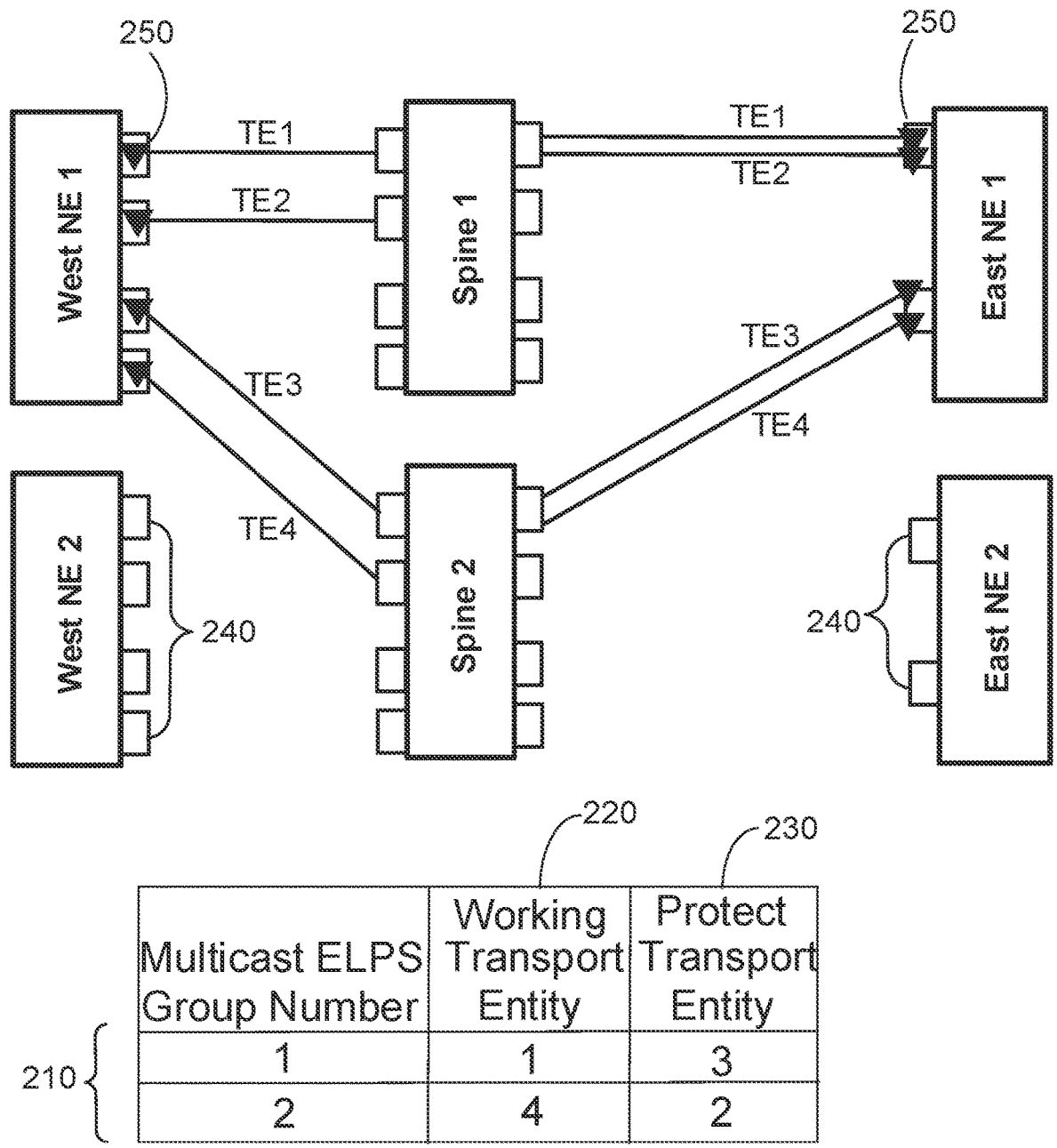
FIG. 2 shows multicast ELPS protection groups in a spine and leaf network.
Figure 3:
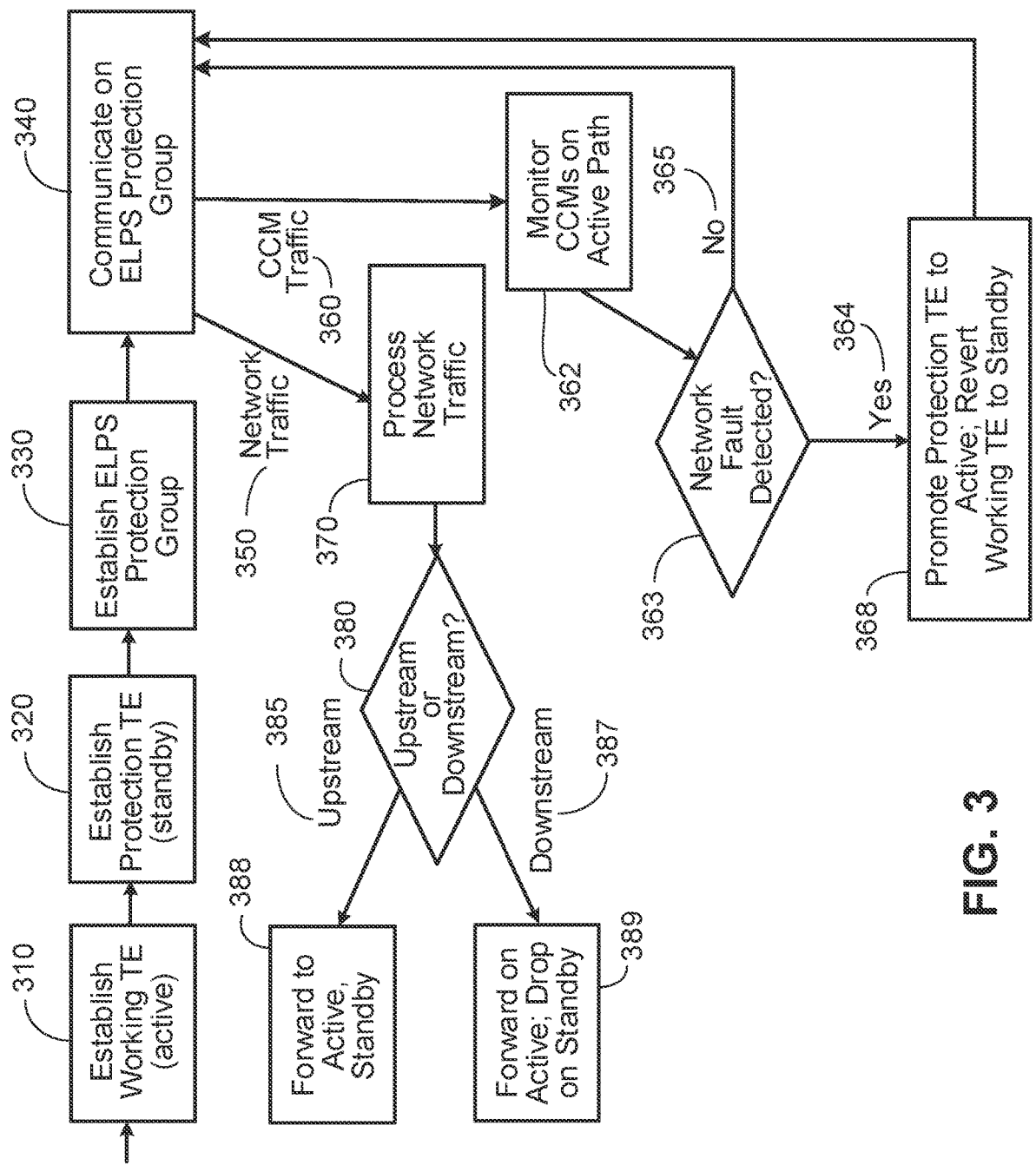
FIG. 3 shows a flowchart for maintaining communication resiliency in a network.

FIG. 3 is a flow chart of an example process for achieving multicast communication resilience in a network. The process can be implemented, for example, by one or more of the devices of FIG. 2. In some implementations, the process can be implemented by one or more data processing apparatus that are in communication with one or more of the devices of FIG. 2. The process can also be implemented as instructions stored on one or more non-transitory computer readable medium, and execution of the instructions by one or more data processing apparatus can cause the one or more data processing apparatus to perform operations of the process.

With respect to FIG. 3, communication resiliency is maintained in an ELPS protection group. A working TE (or another communication path) is established and is set to active 310 and a protection TE is established and set to standby 320 for each protected communication link. The working TE, or communication path, communicatively couples to a MEP of a first network element and a MEP of a second network element, and is an active communication path for the two network elements. The protection TE, or communication path, communicatively couples to a second MEP of the first network element and a second MEP of the second network element, and is a standby path.

An ELPS protection group is established 330 to protect that communication link and communications proceed on the link protected by the ELPS protection group 340. Network traffic received at the network element is processed 370, including determining whether the network traffic received at the network element is upstream or downstream 480. If the network traffic is upstream 385, then the network element forwards that network traffic to the active TE and standby TE 388. If the network traffic is downstream 387, then the network element forwards the network traffic on the active TE and drops the network traffic on the standby TE 389. As network traffic is being received and processed 370, the network element also monitors CCM traffic 362. Using the CCM traffic, the network element can detect a network fault 363. In some implementations, the network fault is detected based on non-responsiveness of the MEP of the first network element or the MEP of the second network element. The network fault can be detected, for example, using continuity check messages generated by the MEP of either the first network element or the second network element. For example, if three continuity check messages in a row are not received, that can indicate that the there is a network fault in the communication path. As another example, continuity check message can be generated to include status information about a local port and/or physical interface, and this continuity check message can be examined to determine the status of a network element. In other implementations, the network fault can be detected based on a physical fault in a connection to the network element.

When a fault is detected by an ELPS group, that information is communicated to its peer ELPS group using the APS protocol. However, there are some applications where there is no peer ELPS group (e.g., "single-ended" ELPS). In those applications there are certain uni-directional faults (for example, in a transceiver the transmit laser fails but the receiver continues to operate) that cannot be detected by any of the means listed above. In that case, the RDI (remote defect indication) bit in the CCM messages can be used to detect these unidirectional faults. In general, the RDI bit is set whenever a defect is received by a MEP, including the defect of losing three consecutive CCMs in a row. One way to detect a unidirectional fault on a particular TE is as follows: if 1) there is an RDI from a peer MEP in the TE and 2) CCMs are being received from all of the MEPs in the MEG, then a uni-directional fault in the direction from the local MEP to the peer MEP in the TE can be declared. If the TE experiencing the uni-directional fault is the active TE, ELPS failover is triggered. If CCMs from all of the MEPs in the MEG are being received, then it can be determined that those MEPs in the MEG are not causing the RDI. Because differences in timing may exist between network elements, in some implementations when conditions 1) and 2) above are detected, a timer may be started rather than immediately failing over; if conditions 1) and 2) are still detected when the timer expires, then an ELPS failover will be triggered. As an example, the timer may be set for 300 msec; however, other values may be used depending on the network topology and its impact on network timing.

If a network fault is detected 364, the standby TE is promoted to active and the active TE is made the standby TE 368, resulting in the formerly standby communication path becoming the active path and carries or forwards received downstream network traffic. While no network fault is detected 365, communication proceeds with the active TE and the standby TE 340.

Figure 5:
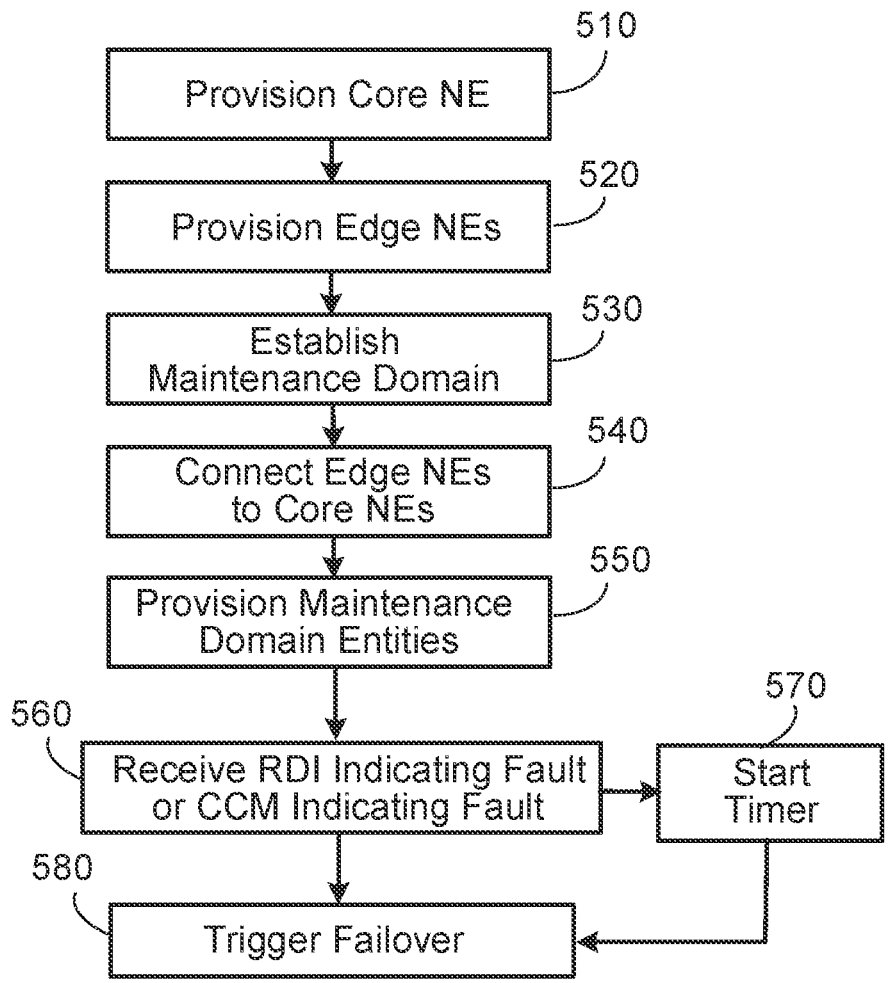
FIG. 5 shows a flowchart for provisioning network elements and maintenance groups in a resilient network.

With respect to FIG. 5, in one embodiment, a method of communication resilience in a network may comprise provisioning a core network element 510 and a first and second edge network element 520. A maintenance domain comprising a mechanism to detect edge to edge faults in the network is established 530. A connection between a first port of the first edge network element and the core network element and a connection between a first port of the second edge network element and the core network element are established 540. A first maintenance domain entity is provisioned at the first port of the first edge network element and a second maintenance domain entity is provisioned at the first port of the second edge network element 550. A uni-directional fault may be detected between the first edge network element and the second edge network element based on receiving at the first edge network element a remote defect indication from the second edge network element 560.

Additional network elements may be added to the network. For instance, a third edge network element may be provisioned 520, and a connection between a first port of the third edge network element and the core network element established 540. A third maintenance domain entity at the first port of the third edge network element may be provisioned 550.

Detecting a uni-directional fault between the first edge network element and the second edge network element is based on one or more of: the remote defect indication from the second edge network element and a plurality of continuity check messages 560. Continuity check messages may originate from one or more of the second and third edge network elements. Detection of a uni-directional fault 560 may trigger a failover 580. Further, detection of a uni-directional fault 560 may trigger a timer 570, wherein if the uni-directional fault condition remains at the expiration of the timer, a failover is triggered 580.

As one example, where each pair of paths, the working path and protection path, is part of a multicast tree in a network with two spine elements, upstream and downstream traffic is handled by a network element. For instance, upstream traffic received at an East NE will be forwarded from an East NE proxy function to both spines over both paths in the pair of paths. Downstream traffic received by the East NE proxy function will be forwarded from the active path and downstream traffic received on the standby path will be dropped. In this example, the West NE will operate proxy functions for each VLAN and the spine element will operate as a snoop function for each VLAN.

As a further example, pairs of paths over which upstream and downstream traffic flows can be maintained using 1+1 ELPS as described in ITU-T G.8031. The effect of this is that during normal operation upstream IGMP and multicast traffic will be duplicated on the working and protect paths. Also, the multicast tables of the spine elements and the West NEs will be synchronized. Synchronization may occur through IGMP proxy and snoop functions. An IGMP snoop function at a spine element listens to IGMP upstream packets and, based on changes in services, it may update IGMP state information at the spine element. This may be referred to as transparent snooping because there is no modification of the upstream packets. The West NE may provide a proxy function whereby if it is already serving certain network traffic to a network node it will not request content from an upstream server when it receives an additional request for that same content from another network node. Instead, the proxy function at the West NE will update its IGMP state table and serve that network traffic stream to the additional node. This may require the West NE proxy to modify downstream traffic.

In a spine and leaf network, the pairs of communication paths may traverse network spines. As one of skill in the art can appreciate, the disclosures herein can be extended to networks including more than two spines. Networks with more than two spines increase the number of pairs of paths between network elements. The spine and leaf topology may be dense, where a path exists from each leaf to each spine, but at a minimum each leaf must connect to two spine elements. To be scalable, the service assignment algorithm must balance class and weight between the multiple pairs of paths when making service assignments.

Figure 4:
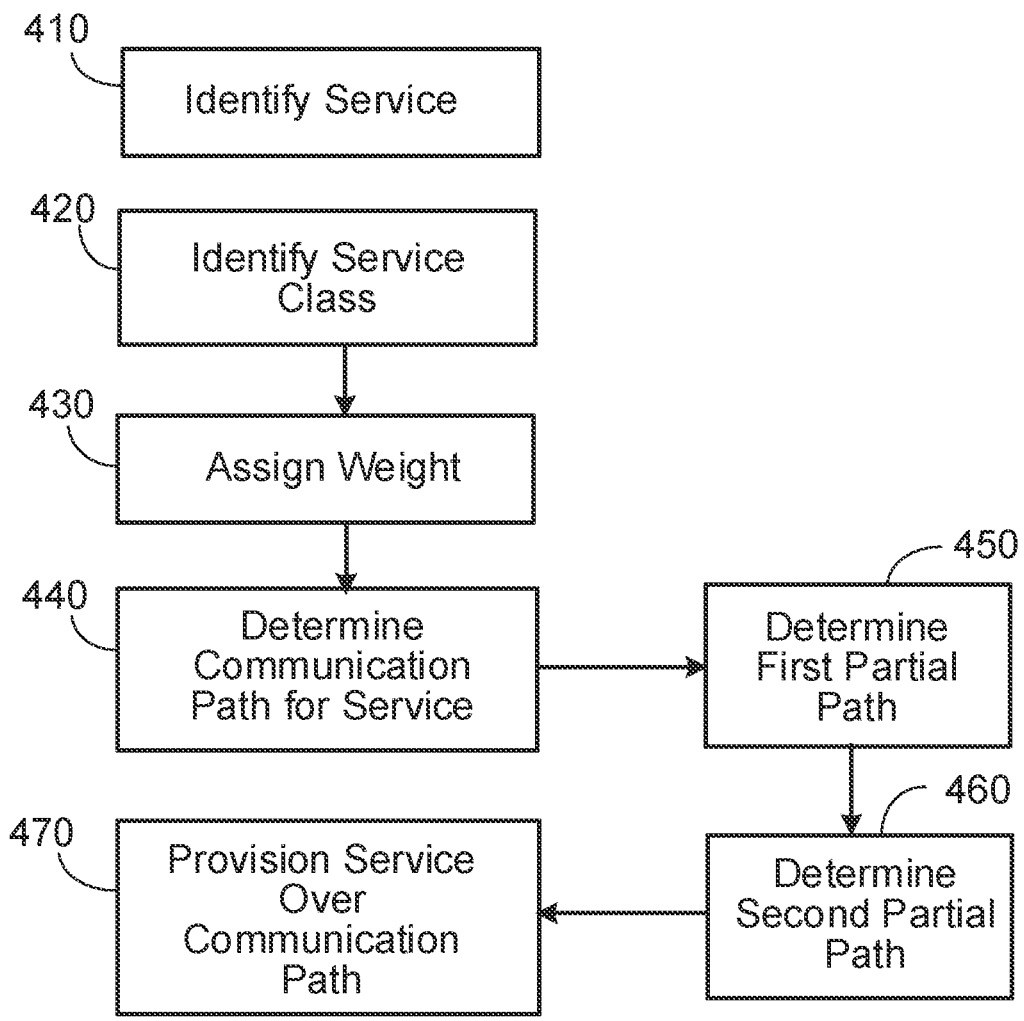
FIG. 4 shows a flowchart for provisioning a service to a communication path.

FIG. 4 is a flow chart of an example process 400 for achieving resilient service assignment in a network. The process 400 can be implemented, for example, by one or more of the devices of FIG. 2. In some implementations, the process 400 can be implemented by one or more data processing apparatus that are in communication with one or more of the devices of FIG. 2. The process 400 can also be implemented as instructions stored on one or more non-transitory computer readable medium, and execution of the instructions by one or more data processing apparatus can cause the one or more data processing apparatus to perform operations of the process 400.

With respect to FIG. 4, a service (e.g., streaming video, video conferencing, IPTV, voice over IP, broadband data) to be provisioned is identified 410 and optimally assigned a communication path. A service class (e.g., standard definition, high definition, quality of service, CIR, PIR, 1000 Mbps or higher class, 100-1000 Mbps class, 100 Mbps or lower class) for the service is determined 420, and the service is assigned a weight 430. A communication path between a first network element and a second network element is determined for the service 440. Because a communication path may traverse intermediate network elements, partial paths that make up the communication path may be determined in order to avoid an imbalance at a network element coupled to one of the partial paths (e.g., an intermediate network element). For instance, if there is one intermediate network element in the communication path, a first partial path between the first network element and an intermediate network element that is located between the first network element and the second network element is determined 450, and a second partial path between the intermediate network element and the second network element is determined 460.

In some implementations, the assignment of the first partial communication path is determined based on the weight assigned to the service, the service class for the service, and/or one or more existing services carried by candidate partial communication paths between the first network element and the intermediate network element. Candidate partial communication paths are partial communications paths between two network elements that are available to have the new service assigned.

In some implementations, the assignment of the second partial communication is determined based on the weight assigned to the service, the service class for the service, and one or more existing services carried by candidate partial working communication paths between the intermediate network element and the second network element.

In some situations, the assignment of the communication path can include balancing services provided over the candidate partial communication paths, as discussed throughout this document. Once the partial paths of the communication path are assigned, the service is provisioned over the communication path 470.

Between a West NE and an East NE across a spine, a given service on a VLAN traverses one of two TEs: a working TE or a protection TE. A given TE has two states: active or standby. These two TEs and their associated services, running on VLANs, form an ELPS (Ethernet linear protection switching) group. In normal operation, the unicast service will traverse the working TE. However, in a fault state, the unicast service will traverse the protection TE. It may revert to the working TE when the failure has been corrected. This is known as 1:1 bidirectional revertive ELPS (G.8031). A down MEP is defined on the interface associated with each end of each TE. CCMs (continuity check messages) are used to determine connectivity and trigger the protection switch and reversion. APS coordinates the switching at the two ends and traverses the protection TE. While the OAM and APS traverse an OAM VLAN, the service VLANs are independent of the OAM VLAN.

With two spines, there are 4 possible transport entities (TEs) between any West NE and any East NE. At a given point in time, any of these TEs can be both the working TE for some services and the protection TE for other services, so that traffic will normally flow on all of these TEs. Every working TE is paired with a protection TE such that for every West NE/East NE combination there are four possible unicast ELPS groups. These groups and TEs must be established before any services can be assigned. The continuity of the transport entities is monitored using CCM from MEPs place on the West NE and East NE physical interfaces. Each West NE has a MEP on each physical interface and each East NE has two MEPs on each physical interface. Each ELPS group is assigned a single S-VID and multiple C-VIDs.

FIG. 1 shows an example of unicast ELPS in a spine and leaf network. The East NEs and the West NEs have physical interfaces 110. Each physical interface 110 of the East NEs has two MEPs 150. Each physical interface 110 of the West NEs has one MEP 150. A unicast ELPS group 140 comprises a working TE 130 and a protect TE 120. As shown in FIG. 1, a working TE 130 communicatively connects a West NE with an East NE via a spine element and a protection TE 120 communicatively connects that West NE with that East NE via a different spine element. The working TE 130 and the protection TE 120 terminate at MEPs 150 on the physical interfaces 110 of the West NE and the East NE.

When a new unicast service is added to the system, the service is assigned to one of the ELPS groups which connects the West NE to the subscriber's East NE. This assignment is done by optimizing the balance of weight and class of services at the West NE ports while considering the weight and class of services at the East NE ports. Note that for a given TE, the link between West NE and spine has may have a different mix of services compared to the link between spine and East NE. Each East NE link has traffic to and from all West NEs and each West NE link has traffic to and from all East NEs. Consequently, the balancing calculations must be done independently between West NE and spine versus spine and East NE.

Each unicast service type will be assigned a class and a weight. When adding a unicast service of given class and weight, two criteria are used jointly: East NE port balance and West NE port balance. East NE port balance may be computed, for each East NE port, through the sum of all services of the same class. Assuming two sums, S1 and S2, corresponding to the East NE ports 1 and 2, if abs(S1−S2) is greater than some threshold (X), then eliminate from consideration the two ELPS groups with working TEs associated with the East NE port with the larger sum. One threshold may be X=5% of the maximum number of subscribers on the East NE. West NE port balance may be computed, for each West NE port, through the sum of weights of all services of the same class. Then, considering the set of those ELPS groups that meet the East NE port balancing criteria, select the ELPS group with the working TE associated with the West NE port with the minimum sum of weights of the same class. The balancing algorithm may include multicast CIR in the East NE and West NE calculations. In another implementation, for each group, compute the sum of weights of the same class at that West NE plus the sum of weights of the same class at the East NE, and select the group with the minimum sum. A threshold may be used to eliminate groups whose sum plus the weight of the new service exceeds the threshold As an example for multicast services, a given West NE has four TEs to each East NE, paired into two multicast ELPS groups. For each multicast VLAN, the West NE and the spine act as normal IGMP proxy and IGMP snoop, respectively. The West NE and the spine have no requirement for additional multicast ELPS functionality. Each East NE will act as a 1+1 ELPS bridge with per-VLAN IGMP proxy. Upstream traffic will be broadcast from proxy function to both spines. Downstream traffic will be received by proxy function from the active TE. This results in a configuration where, during normal operation, IGMP and multicast traffic will be duplicated on the working and protect TE, and the multicast tables in the spines and the West NE ports will be synchronized.

FIG. 2 shows an example of multicast ELPS in a spine and leaf network. The East NEs and the West NEs have physical interfaces 240. Each physical interface 240 of the East NEs has two MEPs 250. Each physical interface 240 of the West NEs has one MEP 250. A multicast ELPS group 210 comprises a working TE 220 and a protect TE 230. As shown in FIG. 2, a working TE 220 communicatively connects a West NE with an East NE via a spine element and a protection TE 230 communicatively connects that West NE with that East NE via a different spine element. The working TE 220 and the protection TE 230 terminate at MEPs 250 on the physical interfaces 240 of the West NE and the East NE.

In one embodiment, there is an OAM VLAN and a service VLAN. An OAM VLAN is associated with the working communication path and another OAM VLAN associated with the protection communication path. In this scenario, there is a 1:1 correspondence between an OAM VLAN and a MEG. The OAM VLAN provides for communication between the MEPS and the ELPS protection groups. The system protects the service VLAN. A network failure is detected by non-responsiveness of a MEP, which indicates that the communication between the MEPs over the OAM VLAN is interrupted. When a failure is detected, the service VLAN switches to the standby path (e.g., the protection path). The upstream service VLAN will continue to forward traffic to both the working and protection paths, but the downstream service VLAN traffic will be forwarded on the standby path, at the East NE. The physical path (e.g., a series of physical links) has VLANs which traversing it. The ELPS protections groups are configured to associate a specific OAM VLAN with the working path and another specific OAM VLAN with the protection path. The state of the ELPS protection group (e.g., designating which path is active and which is standby) determines whether to forward downstream service VLAN traffic received on the working path or the protection path.

As a an example for multicast services, when a network fault is detected on the active TE, the East NE switches downstream receive to the standby TE and sets the standby TE to the active TE. The East NE then continues to forward upstream to both spines. After the failure is resolved, the East NE will not revert unless failure occurs on the active TE (e.g., the standby TE to which downstream receive was switched). After the failure is resolved, the associated spine and West NEs will resynchronize their multicast tables through general membership queries. Additional protocols and processing are not required but may be provided. For multicast, because the East NE acts autonomously, APS is not needed for TE switching and East NEs unaffected by the network fault will not switch. This minimizes service disruption for unaffected OLTs and services.

As one example of assigning multicast services, in a network where each TE logically connects the West NE to every East NE via multicast replication, two trees are formed per West NE with the West NE as the root. When a new multicast VLAN is added to the system, the VLAN is assigned to one of the 2 ELPS groups which connects the West NE to the East NEs. The service is assigned to the ELPS group with the minimum sum of the weights of all multicast services of the same class. For example, setting the class and weight to one for all service types results in a round robin assignment of multicast services to pairs of paths, alternating between the two ELPS groups. Service assignment may be limited to groups where the CIR can be met following failover, however this is not required and the network configuration may be such that service assignment is not so limited. For instance, CIR may be oversubscribed by communication providers.

As one of skill in the art will appreciate, there are many possible algorithms to optimize service assignment to ELPS groups. For instance, for a given West NE/East NE pair where there are four ELPS groups, four possible algorithms are described. A random algorithm will randomly pick 1 of the 4 ELPS groups seeking uniform distribution of the number of services. A round robin algorithm will select the next ELPS group in a circular sequence [1, 2, 3, 4]. A minimum PIR algorithm (MinPIR) selects the ELPS group that has a minimum sum of PIR for the West NE to spine link associated with the working TE of that ELPS group. A minimum CIR algorithm (MinCIR) selects the ELPS group that has a minimum sum of CIR for the West NE to spine link associated with the working TE of that ELPS group. The West NE to spine link (e.g., 100G) of a TE generally has higher utilization than the spine to East NE link (e.g., 100G) because of the ratio of East NE links to West NE links. This may be because the same amount of unicast traffic flows from West NE to spine compared to spine to East NE.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products or in a single hardware element or multiple hardware elements, or some combination thereof.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A communication resilient network, comprising:
   one or more data processing apparatus configured to execute instructions that cause the one or more data processing apparatus to provision:
   a core network element;
   a first edge network element;

a second edge network element;

a maintenance domain comprising a mechanism to detect edge to edge faults on the communication resilient network;

wherein a first port of the first edge network element connects to the core network element and a first port of the second edge network element connects to the core network element;

wherein a first maintenance domain entity is provisioned at the first port of the first edge network element and a second maintenance domain entity is provisioned at the first port of the second edge network element;

wherein a uni-directional fault between the first edge network element and the second edge network element is detected by the first edge network element based on the first edge network element (i) receiving a remote defect indication from the second edge network element and (ii) continuing to receive continuity check messages (CCMs) from all maintenance domain entities in a maintenance entity group of a transport entity that logically connects the first edge network element and the second edge network element, wherein the continued receipt of the CCMs by the first edge network element prevents three missed CCM messages in a row from being used to detect the uni-directional fault.

2. The communication resilient network of claim 1 wherein the detection of a uni-directional fault triggers a failover.

3. The communication resilient network of claim 1 wherein the detection of a uni-directional fault triggers a timer, wherein if the uni-directional fault condition remains at expiration of the timer, a failover is triggered.

4. A method of communication resilience in a network, comprising:

provisioning a core network element;

provisioning a first edge network element;

provisioning a second edge network element;

establishing a maintenance domain comprising a mechanism to detect edge to edge faults in the network;

establishing a connection between a first port of the first edge network element and the core network element establishing a connection between a first port of the second edge network element and the core network element;

provisioning a first maintenance domain entity at the first port of the first edge network element provisioning a second maintenance domain entity at the first port of the second edge network element; and detecting a uni-directional fault between the first edge network element and the second edge network element based on receiving at the first edge network element a remote defect indication from the second edge network element while the first edge network element continues to receive continuity check messages (CCMs) from all maintenance domain entities in a maintenance entity group of a transport entity that logically connects the first edge network element and the second edge network element, wherein the continued receipt of the CCMs by the first edge network element prevents three missed CCM messages in a row from being used to detect the uni-directional fault.

5. The method of claim 4 wherein the continuity check messages originate from one or more of: the second edge network element and a third edge network element.

6. The method of claim 4 wherein the detection of a uni-directional fault triggers a failover.

7. The method of claim 4 wherein the detection of a uni-directional fault triggers a timer, wherein if the uni-directional fault condition remains at expiration of the timer, a failover is triggered.

8. A communication resilient network, comprising:

one or more data processing apparatus configured to execute instructions that cause the one or more data processing apparatus to provision:

a spine network element;

a first edge network element;

a second edge network element;

a maintenance domain comprising a mechanism to detect edge to edge faults on the communication resilient network;

wherein a first port of the first edge network element connects to the spine network element and a first port of the second edge network element connects to the spine network element;

wherein a first maintenance domain entity is provisioned at the first port of the first edge network element and a second maintenance domain entity is provisioned at the first port of the second edge network element;

wherein a uni-directional fault between the first edge network element and the second edge network element is detected by the first edge network element based on the first edge network element (i) receiving a remote defect indication from the second edge network element and (ii) continuing to receive continuity check messages (CCMs) from all maintenance domain entities in a maintenance entity group of a transport entity that logically connects the first edge network element and the second edge network element, wherein the continued receipt of the CCMs by the first edge network element prevents three missed CCM messages in a row from being used to detect the uni-directional fault.

9. The communication resilient network of claim 8 wherein the detection of a uni-directional fault triggers a failover.

10. The communication resilient network of claim 8 wherein the detection of a uni-directional fault triggers a timer, wherein if the uni-directional fault condition remains at expiration of the timer, a failover is triggered.

* * * * *